(12) United States Patent
Ashutosh et al.

(10) Patent No.: US 8,816,026 B2
(45) Date of Patent: Aug. 26, 2014

(54) METHOD AND APPARATUS FOR PREPARING POLYMER BEADS OF UNIFORM PARTICLE SIZE BY SUSPENSION POLYMERISATION

(71) Applicant: Thermax Limited, Pune (IN)

(72) Inventors: Apte Ashutosh, Pune (IN); Naik Shirish, Pune (IN)

(73) Assignee: Thermax Limited, Pune (IN)

( * ) Notice: Subject to any disclaimer, the term of this patent is extended or adjusted under 35 U.S.C. 154(b) by 0 days.

(21) Appl. No.: 13/758,563

(22) Filed: Feb. 4, 2013

(65) Prior Publication Data

US 2014/0080981 A1    Mar. 20, 2014

(30) Foreign Application Priority Data

Sep. 20, 2012  (IN) .......................... 2735/MUM/2012

(51) Int. Cl.
| | |
|---|---|
| *C08F 2/00* | (2006.01) |
| *B01J 49/00* | (2006.01) |
| *B01J 39/20* | (2006.01) |
| *B01J 4/00* | (2006.01) |
| *B01J 19/24* | (2006.01) |
| *C08F 2/04* | (2006.01) |
| *C08F 2/01* | (2006.01) |
| *B01J 14/00* | (2006.01) |
| *B01F 15/02* | (2006.01) |
| *C08F 2/20* | (2006.01) |
| *B01J 19/18* | (2006.01) |
| *B01F 3/08* | (2006.01) |

(52) U.S. Cl.
CPC . *C08F 2/04* (2013.01); *B01J 4/004* (2013.01); *B01J 19/241* (2013.01); *B01J 2219/00094* (2013.01); *C08F 2/01* (2013.01); *B01J 14/00* (2013.01); *B01F 15/024* (2013.01); *C08F 2/20* (2013.01); *B01J 19/185* (2013.01); *B01J 19/18* (2013.01); *B01J 2219/0004* (2013.01); *B01F 3/0807* (2013.01); *B01J 4/002* (2013.01)
USPC .................. 526/88; 521/29; 521/31; 521/33; 521/38

(58) Field of Classification Search
CPC ........... C08F 2/18; B01J 14/00; B01J 19/241; B01J 4/004
USPC .............................. 526/88; 521/38, 29, 31, 33
See application file for complete search history.

(56) References Cited

U.S. PATENT DOCUMENTS

| | | | |
|---|---|---|---|
| 3,922,255 A | 11/1975 | Koestler et al. | |
| 4,427,794 A | 1/1984 | Lange et al. | |
| 4,444,961 A * | 4/1984 | Timm .............................. | 526/88 |

FOREIGN PATENT DOCUMENTS

| | | | |
|---|---|---|---|
| EP | 2088 161 | * | 8/2009 |
| EP | 2088161 | | 8/2009 |

*Primary Examiner* — William Cheung
(74) *Attorney, Agent, or Firm* — Klein, O'Neill & Singh, LLP

(57) ABSTRACT

Monomer solution and liquid solution immiscible with the monomers in the monomer solution are cocurrently jetted upwardly in a pulsating manner in a reaction vessel. Monomer droplets are allowed to rise up in a controlled and smooth manner under the dynamic forces exerted by differential flow rate and differential pressure between the monomer and liquid solutions and the differential densities between the monomer and liquid solutions without causing coalescence, agglomeration and breakup of the monomer droplets and to stabilize by partial polymerization of the droplets at 50-60° C. The monomer droplets flow out horizontally into a polymerization reactor and get polymerized in the polymerization reactor under agitation at 80-85° C. The polymer beads are dried at 80-100° C. and sieved.

3 Claims, 2 Drawing Sheets

METHOD AND APPARATUS FOR PREPARING POLYMER BEADS OF UNIFORM PARTICLE SIZE BY SUSPENSION POLYMERISATION

CROSS-REFERENCE TO RELATED APPLICATION

This application claims priority to Indian Patent Application No. 2735/MUM/2012, filed on Sep. 20, 2012, the disclosure of which is incorporated herein by reference in its entirety.

PREAMBLE TO THE DESCRIPTION

The following specification particularly describes the invention and the er in which it is to be performed:

FIELD OF THE INVENTION

This invention relates to a method and apparatus for preparing polymer beads of uniform particle size by suspension polymerisation.

BACKGROUND OF THE INVENTION

Methods for preparing polymer beads of uniform particle size (UPS) by suspension polymerization are generally carried out by jetting an organic phase of polymerizing monomers containing initiators in an immiscible liquid phase containing suspension stabilizers through capillary openings to form monomer droplets in the liquid phase and then polymerizing the monomer droplets to polymer beads. The polymer beads are generally converted into various ion exchange resins. Cation exchange resins are produced by sulphonation of the polymer beads, whereas chloromethylation and amination of the polymer beads give anion exchange resins. In case of acrylic cation exchange resins subsequent hydrolysis and aminolysis of acrylic anion exchange resin is carried out after acrylic polymerisation. Ion exchange resins have a variety of applications, for example, they are used in various water treatment applications, deacidification or dealkalisation applications, removal of contaminants or impurities, decolouration of sugar or water or recovery of metal.

Koestler and Robin describe a method for preparing polymer beads of uniform particles size by suspension polymerization comprising passing a monomer liquid into a first column (droplet formation column) from one end of the first column through a perforated disc having orifices, cocurrently passing a monomer immiscible aqueous liquid from the said one end of the first column, passing the droplet-containing liquid from the other end of the first column into the upper section of a second column (gelation column) and cocurrently introducing into the upper section of the second column, a downflowing aqueous stream to partially polymerise the droplets, allowing the partially polymerized droplets dispersed in the aqueous liquid to flow from the lower section of the second column into a separation vessel for gravity separation of the droplets and for concentration of the droplets in the aqueous liquid and allowing a comparatively concentrated slurry of the droplets to flow from the separation vessel to a bank of agitated polymerization reactors, wherein the droplets are further polymerized to polymer beads (U.S. Pat. No. 3,922,255).

The above method requires a large number of equipments for the formation and concentration of the droplets, namely a droplet formation column, a gelation column for partial polymerization and stabilisation of the droplets and a separation vessel for concentration of the droplets and formation of a droplet slurry. Because of the large number of equipments, the cost of the equipment configuration for carrying out the method is very high. Cycle time for carrying out the method is also increased as the monomer and aqueous solutions and the droplets pass through a series of equipments in a complicated and zig-zag manner. Further, the monomer phase and aqueous phase enter the droplet formation column from the bottom and side thereof, respectively and in the gelation column, the liquid containing droplets enter from the side thereof, whereas the aqueous stream enters from the top thereof. As a result, there are chances for obstruction of flow and coalescence of the droplets in the droplet formation column and gelation column thereby affecting the uniformity of the droplets and ultimately that of the polymer beads.

Lange and Striiver describe a process for the production of polymer beads of improved uniform particle size and uniform quality which comprises feeding a monomer solution and an aqueous solution immiscible with the monomer solution cocurrently into a reaction column from the bottom thereof using concentric dual nozzles. The column comprises a droplet formation section, encapsulation section and shell hardening section. Droplets of the monomer are formed in the aqueous solution in the droplet formation section of the reaction column. The droplets are encapsulated and hardened in the encapsulation and shell hardening sections of the reaction column respectively by feeding encapsulating and shell hardening components into the respective sections of the column from the side thereof. The temperatures in the various sections of the reaction column are different and are independently controlled with monitoring devices. The encapsulated and shell hardened droplets are allowed to flow down from the reaction column into a polymerization vessel. Because of the encapsulation, the droplets will be stable during agitation in the polymerization vessel, wherein the droplets are further polymerized to polymer beads. Following polymerization, the encapsulation is removed (U.S. Pat. No. 4,427,794).

In the above process, the monomer droplets are formed, encapsulated and shell hardened in three different sections of the same reaction column and the different temperatures in the various sections of the reaction column are independently controlled with monitoring devices. Besides, it involves removal of the shells of the droplets. As a result of all this, the cycle time increases and the process is expensive and difficult and cumbersome to carry out. The temperature monitoring devices increase the capital and maintenance cost of the reaction column and reduces reliability. Due to the temperature gradient across the various sections of the reaction column, the droplets may experience thermal shocks. There are also chances for obstruction of flow and coalescence of the droplets due to the flow of the encapsulating and shell hardening components from the side of the reaction column. Thermal shocks and coalescence of the droplets will reduce the uniformity of the polymer beads.

Timm teaches a methods and an apparatus for preparing uniform particle size polymer beads. A monomer jet having laminar flow characteristics is formed by flowing a monomer phase comprising a polymerizable monomer through an orifice plate having a plurality of orifices into a continuous suspension phase comprising a liquid immiscible with the monomer and a stabilizer. The monomer jet is vibratorily excited to breath it into droplets comprising the monomer. The droplets are polymerized into spheroidal polymer beads in a polymerisation vessel (U.S. Pat. No. 4,444,961).

Vibratory excitation is given to the monomer jet by vibratory devices such as mechanical, electroacoustic, hydroacoustic or electromagnetic vibrators or magnetoresistive transducers all of which increase the cost in terms of capital investment, maintenance and energy consumption and also reduce reliability. Due to the vibratory excitation, there is also possibility for the droplets to coalesce thereby reducing the uniformity of the particle size distribution of the polymer beads. Further, the liquid phase enters the apparatus from the side thereof, whereas the jetting of the monomer phase through the orifice plate at the bottom of the apparatus enters the liquid phase in the upward direction. As a result of this also, there are chances for obstruction of flow and coalescence of the droplets thereby further reducing the uniformity of the particle size distribution of the polymer beads.

Miyata et al describe a method for preparing an oil-in-water type uniform dispersion of liquid droplet. The method comprises ejecting an oil type monomer into an aqueous medium containing a dispersion stabilizer, which forms a continuous phase and moves upwards, a hydrophobic liquid having a specific gravity smaller than the aqueous medium, through a nozzle plate having a plurality of perforations capable of ejecting the hydrophobic liquid upwards, to form liquid droplets of the hydrophobic liquid in the aqueous medium. The nozzle plate comprises a number of perforations for ejection of the hydrophobic liquid arranged in a ring form around the center portion where no perforation is provided, ie without uniformly providing such perforations over the entire surface whereby it is possible to efficiently form an excellent dispersion without swaying of ejected hydrophobic liquid streams in the vicinity of perforations for ejection and provide a large amount of perforations for ejection as a whole and improve the productivity of the dispersion.

In case the method is concerned with the preparation of polymer beads of uniform particle size, the hydrophobic liquid is a polymerizable monomer containing a polymerization initiator. A dispersion of a polymerizable monomer of uniform droplet size is formed in an apparatus having an outlet at an upper portion, and inlets for a monomer and an aqueous medium at a lower portion. The dispersion is discharged continuously from the upper outlet of the apparatus and introduced into a polymerization reactor for polymerization into polymer beads of uniform size. An aqueous medium containing a dispersion stabilizer is continuously supplied to the apparatus from the side thereof for forming the dispersion of the monomer of uniform droplet size, which is filled with the aqueous medium, to form a continuous phase of the aqueous medium moving upwards and being continuously discharged from the upper outlet of the apparatus. The forward end of the monomer inlet at the lower portion of the apparatus is provided with nozzle plate for forming monomer droplets with the aqueous phase.

In Miyata et al, the monomer solution and aqueous solution are fed counter currently and there are chances for the monomer droplets to coalesce and obstruct upward movement of the droplets in the aqueous solution thereby reducing the uniformity of the particle size distribution of the polymer beads. Further a greater force is required to be exerted on the jetting to facilitate upward movement of the monomer droplets in the aqueous solution thereby increasing the power requirement of the apparatus.

EP 2088161 A1 describes a method for preparing monodisperse crosslinked bead polymers comprising introducing droplets having a harmonic mean size from 50 to 1500 microns and comprising at least one monomer, at least one crosslinker and a free-radical polymerization initiator into an aqueous medium through orifices in a droplet forming vessel to produce an aqueous suspension of unencapsulated droplets having a volume fraction of droplets from 35 to 64%. The aqueous suspension of droplets is allowed to flow in a downward direction in a pipe such that ratio of droplet harmonic mean size to inside pipe diameter is from 0.001 to 0.35, mean linear flow velocity is from 0.5 to 2.5 ft/s (0.15 to 0.75 m/s) and temperature is maintained at least 20° C. below a temperature at which the polymerization initiator has a half-life of 1 hour. The monomer droplets are polymerized in a polymerization reactor set up at lower level with respect to the droplet forming vessel.

The monomer droplets are formed by known methods including vibrational jetting and natural jetting. Flow control of polymer droplets under gravity into the polymerization reactor is quite difficult and there are chances for the droplets to coalesce and obstruct flow of droplets thereby affecting the uniformity of the particle size distribution of the polymer beads. Further vibrational jetting mechanisms will increase the cost in terms of capital investment, maintenance and power consumption and reduce reliability.

There is thus still need for methods and equipments for preparing polymer beads of uniform particle size by suspension polymerization, which are simple and easy to carry out and which are cost effective and which give polymer beads of improved uniform particle size and quality in a reduced cycle time.

DESCRIPTION OF THE INVENTION

According to the invention there is provided a method for preparing polymer beads of uniform particle size by suspension polymerization comprising:

(i) jetting a monomer solution of polymerizing monomers containing initiators into an upwardly flowing stream of monomer droplets through a plurality of orifices of 50-300 micron sizes at the bottom of a vertically located monomer droplets forming reaction vessel in a pulsating manner at a flow rate of 2-4 liters per hr and at a pressure of 0.2 to 1 $Kg/cm^2$ and simultaneously cocurrently jetting a liquid solution immiscible with the monomers and containing suspension stabilizers into an upwardly flowing stream through a plurality of holes of 0.5-1 mm sizes at the bottom of the reaction vessel spaced above and around the outer periphery of the orifices in a pulsating manner at a flow rate of 4-8 liters per hr and at a pressure of 2.5 to 3 $Kg/cm^2$. the ratio between the monomer solution and the liquid solution being 1:10 v/v and the holes being spaced above the orifices at a distance of 10-40 mm;

(ii) allowing the monomer droplets in the liquid solution to rise up in the reaction vessel in a controlled and smooth manner under the dynamic forces exerted by differential flow rate and differential pressure between the pulsating monomer solution and liquid solution supplies and the differential densities between the monomer and liquid solutions without causing coalescence, agglomeration and breakup of the monomer droplets and allowing monomer droplets to stabilize by partial polymerization of the droplets by the suspension stabilizers in the liquid solution at 50 to 60° C. in the reaction vessel;

(iii) allowing the monomer droplets in the liquid solution to flow out from the reaction vessel horizontally into a polymerization reactor fitted with agitator and located at an elevated position with respect to the reaction vessel and get polymerized in the polymerization reactor at 80-85° C.

(iv) drying the polymer beads at 80 to 100° C.; and (v) sieving the polymer beads.

According to the invention there is also provided an apparatus for preparing polymer beads of uniform particle size by suspension polymerization comprising a vertically located monomer droplets forming reaction vessel defining contiguously a monomer solution distribution section at the bottom of the reaction vessel, a monomer droplet viewing first transparent section above the monomer solution distribution section, a monomer droplet stabilizing section above the first transparent section, a monomer droplet viewing second transparent section above the monomer droplet stabilizing section and a turbulence dampening and droplet discharging section above the second transparent section and at the top of the reaction vessel, wherein the monomer solution distribution section is connected at the bottom thereof to a pulsating monomer solution supply capable of supplying a monomer solution containing initiators in a pulsating manner at a flow rate of 2-4 liters per hour and at a pressure of 0.2 to 1 $Kg/cm^2$ and the monomer solution distribution section comprises a jetting orifice plate at the top thereof having a plurality of orifices of 50-300 micron size, the first transparent section comprises a jetting hollow tubular ring located at the bottom thereof above and spaced apart from the orifice plate at a distance of 10-40 mm with respect to the orifice plate, the tubular ring surrounding the outer periphery of the orifices in the orifice plate and having a plurality of spaced apart holes of 0.5-1 mm size at the upper face thereof, the tubular ring being connected to a pulsating liquid solution supply capable of supplying a liquid solution immiscible with the monomer solution and containing suspension stabilizers at a flow rate of 4-8 liters per hr and at a pressure of 2.5 to 3 Kg per $cm^2$, the ratio between the monomer solution and liquid solution being 1:10 v/v and the monomer droplet stabilizing section comprises heating means to heat and stabilize the monomer droplets partially in the liquid solution in the monomer droplet stabilizing section at 50-60° C. and the turbulence dampening and droplet discharging section comprises a monomer droplet outlet line connected to a horizontal droplet flow line and a polymerization reactor located at an elevated position with respect to the reaction vessel in the proximity of the horizontal droplet flow line and connected to the horizontal droplet flow line at the top thereof, the polymerization reactor being fitted with agitator and heating means to heat and polymerise the monomer droplets to polymer beads at 80-85° C., the polymerization reactor further having a polymer bead discharge line fitted with a valve at the bottom thereof.

Examples of the monomer solution containing initiator and liquid solution containing suspension stabilizers that can be used according to the invention are monomer solution comprising styrene, divinyl benzene (DVB) and benzoyl peroxide (BPO) and liquid solution comprising water, polyvinyl alcohol and NaCl for poly-styrene-DVB copolymer of Gel type; monomer solution comprising styrene, divinyl benzene, isobutyl alcohol (IBA) and benzene peroxide and liquid solution comprising water, hydroxy ethyl cellulose (HEC), calcium chloride, sodium lignosulphonate and NaCl for polystyrene DVB copolymer of macroporous (MP) type; monomer solution comprising styrene, benzoyl peroxide and divinyl benzene and liquid solution comprising water, polyvinyl alcohol. $NH_4Cl$, maxfloc T (poly DMDAAC) and SLS (sodium lauryl sulfonate) for fine mesh polystyrene-DVB copolymer; monomer solution comprising divinyl benzene, benzoyl peroxide, solvent such as toluene or heptane and liquid solution comprising water, HEC. SLS and calcium chloride for adsorbent type polystyrene DVB copolymer; monomer solution comprising ethyl acrylate, methyl methacrylate (MMA), divinyl benzene, azo bis isobutyronitrile and hydrophobic solvent such as heptane and liquid solution comprising water. HEC and calcium chloride for polyacrylic DVB type copolymer; monomer solution comprising methyl acrylate, divinyl benzene. IBA and benzoyl peroxide and liquid solution comprising water, NaCl, calcium chloride, HEC for polyacrylic-DVB copolymer of MP type; monomer solution comprising ethyl acrylate, methacrylic acid, divinyl benzene, azo bis isobutyronitrile and liquid solution comprising water, HEC and calcium chloride for anionic gel type polyacrylic DVB copolymer, monomer solution comprising ethyl acrylate or methyl acrylate, methacrylic acid, divinyl benzene and azo bis isobutyronitrile and liquid solution comprising water, carboxy methyl cellulose (CMC) and sodium chloride for polyacrylic copolymer of Gel type; or monomer solution comprising ethyl acrylate, methacrylic acid, divinyl benzene, heptane, azo bis isobutyronitrile and liquid solution comprising water, CMC and sodium chloride for polyacrylic copolymer of MP type.

BRIEF DESCRIPTION OF THE DRAWINGS

In the accompanying drawings.

DESCRIPTION OF EMBODIMENT OF THE INVENTION

Figure 1:
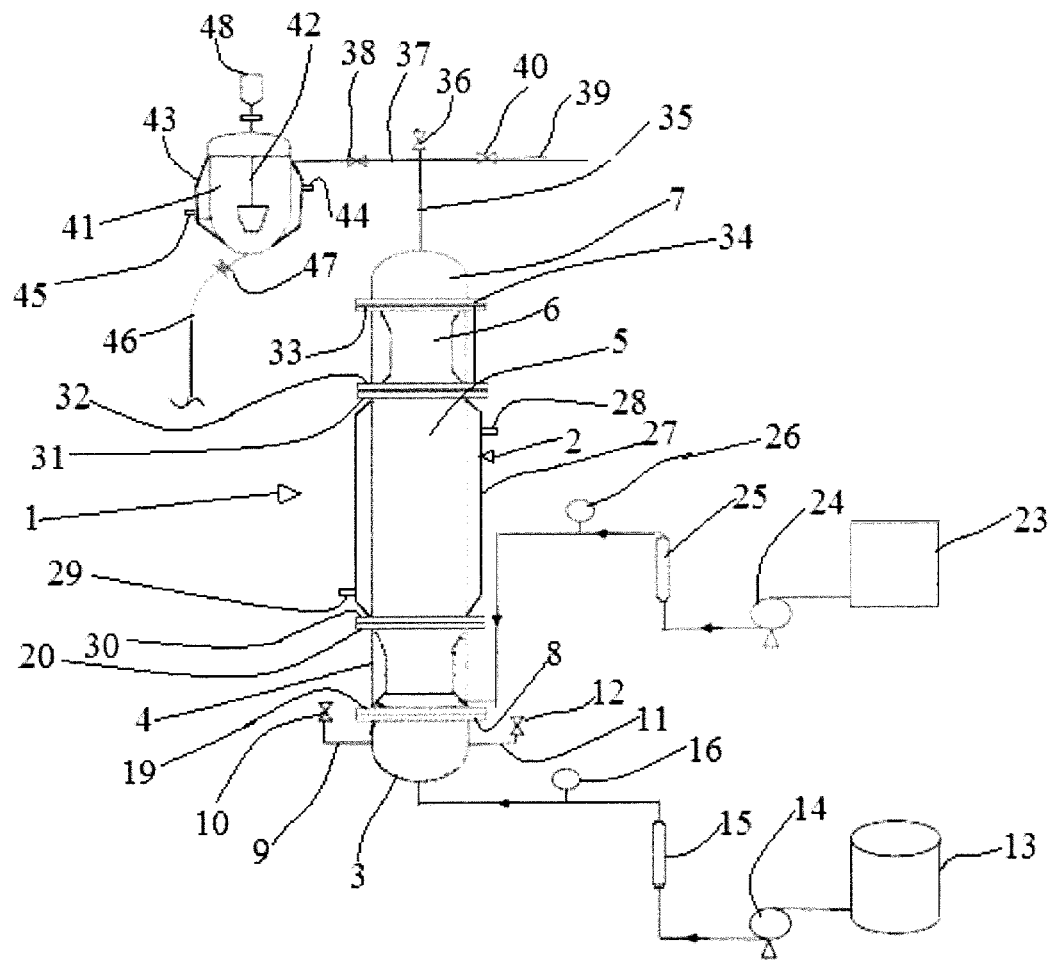
FIG. 1 is a schematic view of the apparatus for preparing polymer beads of uniform particle size by suspension polymerization according to an embodiment of the invention.
Figure 2:
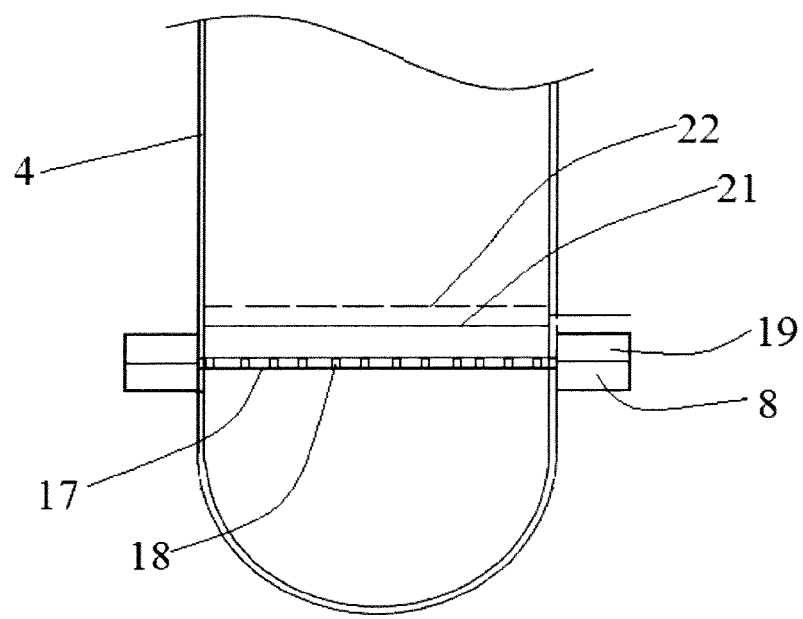
FIG. 2 is a schematic enlarged view of the bottom portion of the apparatus of FIG. 1.
Figure 3:
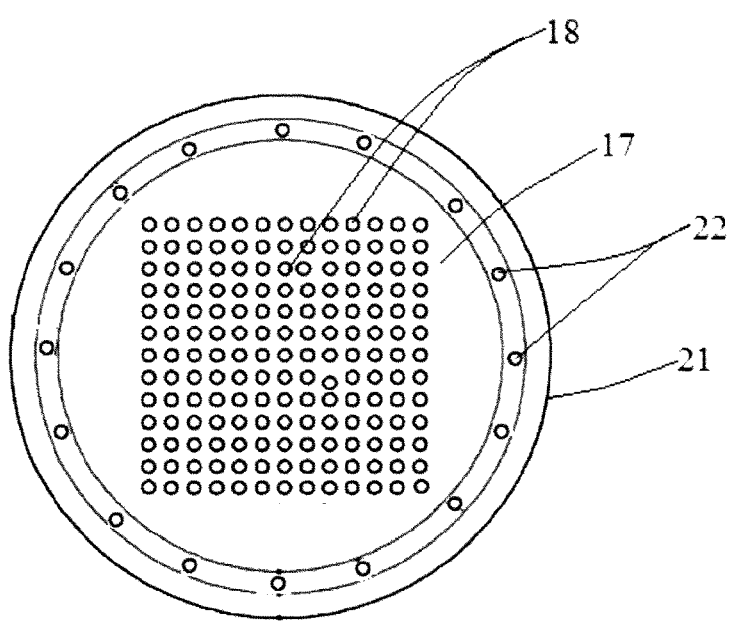
FIG. 3 is a schematic view of the orifice plate and tubular ring of the apparatus of FIG. 1 from the top thereof.

As illustrated in FIGS. 1 to 3 of the accompanying drawings, the apparatus 1 for preparing polymer beads of uniform particle size by suspension polymerization comprises a vertically located monomer droplets forming reaction vessel 2 defining contiguously a monomer solution distribution section 3 at the bottom of the reaction vessel, a monomer droplet viewing first transparent section 4 above the monomer solution distribution section, a monomer droplet stabilizing section 5 above the first transparent section, a monomer droplet viewing second transparent section 6 above the monomer droplet stabilizing section and a turbulence dampening and droplet discharging section 7 above the second transparent section and at the top of the vessel.

The monomer solution distribution section 3 is spherical shaped and comprises a top mounting flange 8 and a monomer solution priming inlet line 9 provided with an inlet valve 10 and a monomer solution priming vent line 11 provided with an vent valve 12. Priming of the monomer solution distribution section with a monomer solution is carried out by opening the inlet valve 10 and vent valve 12 and allowing the monomer solution to flow through the monomer solution distribution section. The monomer solution distribution section is connected at the bottom thereof to a pulsating monomer solution supply capable of supplying a monomer solution containing initiators in a pulsating manner. As an example, the pulsating monomer solution supply comprises a tank 13 containing the monomer solution and connected to the bottom of the monomer solution distribution section through a peristaltic pump 14, rotameter 15 and pressure gauge 16. The monomer solution distribution section 3 comprises an orifice plate 17 at the top thereof having a plurality of orifices 18 of 50-300 micron sizes (FIGS. 2 and 3). The monomer solution distribution section and orifice plate are preferably made of stainless steel. The monomer solution distribution section helps to prevent turbulence and to evenly distribute the monomer solution across the orifice plate.

The monomer droplet viewing first transparent section 4 is preferably made of toughened transparent glass and comprises a bottom mounting flange 19 detachably fixed to the top mounting flange 8 of the monomer solution distribution section and a top mounting flange 20. The first transparent section 4 also comprises a hollow tubular ring 21 located at the bottom thereof above and spaced apart from the orifice plate 5 (FIGS. 2 and 3). The tubular ring surrounds the outer periphery of the orifices in the orifice plate and has a plurality of spaced apart holes 22 of 0.5-1 mm size at the upper face thereof. The tubular ring is preferably made of stainless steel and is connected to a pulsating liquid solution supply capable of supplying a liquid solution immiscible with the monomer solution and containing suspension stabilizers. As an example, the pulsating liquid solution supply comprises a tank 23 containing a liquid solution and connected to the tubular ring through a peristaltic pump 24, rotameter 25 and pressure gauge 26.

The monomer droplet stabilizing section 5 is preferably made of stainless steel and comprises a jacket 27 having a thermic fluid inlet 28 and a thermic fluid outlet 29 for circulating a thermic fluid (not shown) therethrough and heating the monomer droplets in the stabilizing section at a temperature of 50-60° C. The jacket 27 is preferably made of mild steel. The monomer droplet stabilizing section comprises a bottom mounting flange 30 at the bottom thereof detachably fixed to the top mounting flange 20 of the first transparent section and a top mounting flange 31 at the top thereof.

The second transparent section 6 is preferably made of toughened transparent glass and comprises a bottom mounting flange 32 at the bottom thereof detachably fitted to the top mounting flange 31 at the top of the monomer stabilizing section and a top mounting flange 33 at the top thereof. The turbulence dampening and droplet discharging section 7 at the top of the reaction vessel is preferably spherical and comprises a bottom mounting flange 34 at the bottom thereof detachably fixed to the top mounting flange 33 of the second transparent section. The turbulence dampening and droplet discharging section also comprises a droplet outlet line 35 at the top thereof provided with a liquid solution priming valve 36 and connected to a horizontal droplet flow line 37 provided with valve 38. 39 is a bypassline provided with valve 40 and connected to the droplet outlet line. The turbulence dampening and droplet discharging section helps to dampen turbulence of monomer droplets in the liquid solution and to ensure a smooth outflow of the monomer droplets in the liquid solution from the reaction vessel. The reaction vessel is primed with the liquid solution by opening the priming valve 36. In case the monomer droplet flowing out through the droplet outflow line is required to be bypassed, for instance for testing purpose, the bypass line is opened by the opening the valve 40 and samples of the monomer droplets are collected through the bypass line for testing.

The apparatus also comprises a polymerization reactor 41 located at an elevated position with respect to the reaction vessel in the proximity of the horizontal droplet flow line and fitted with agitator 42 and also a jacket 43 provided with thermic fluid inlet 44 and thermic fluid flow outlet 45 for circulation of a thermic fluid through the jacket in order to maintain a polymerization temperature of 80-85° C. in the polymerization reactor. The polymerization reactor is also provided with a polymer beads discharge line 46 having a valve 47. Agitator motor of the polymerization reactor is marked 48.

In order to prepare polymer beads of uniform particle size by suspension polymerization a monomer solution (not shown) of polymerizing monomers containing initiators is jetted into an upwardly flowing stream of monomer droplets (not shown) through the orifices 18 in the orifice plate 17 at the bottom of the reaction vessel 1 in a pulsating manner at a flow rate of 2-4 liters per hr and pressure of 0.2 to 1 Kg/cm$^2$, preferably at a flow rate of 2.7-3.3 liters per hr and at a pressure of 0.3-0.5 kg/cm$^2$. Simultaneously a liquid solution (not shown) immiscible with the monomer and containing suspension stabilizers is cocurrently jetted into an upwardly flowing stream through the holes 22 at the upper face of the tubular ring 21 spaced above the orifice plate at a flow rate of 4-8 liters per hr and at a pressure of 2.5 to 3 Kg/cm$^2$, preferably at a flow rate of 5-6 liters per hr and at a pressure of 2.8 Kg/cm$^2$. The ratio between the monomer solution and the liquid solution is maintained at 1:10 v/v, preferably 1:4 v/v. The holes in the tubular ring are disposed above the orifices in the orifices plate at a distance of 10-40 mm, preferably 25 mm. Monomer droplet formation is viewed through the first transparent section 4.

Under the dynamic forces exerted in the upward direction resulting from the differential pulsating flow rate and differential pressure between the monomer solution and liquid solution jetting at a height difference of 10-40 mm and the differential density between the monomer solution and liquid solution, the monomer droplets in the liquid solution move up in the reaction vessel 1 in a controlled and smooth manner without causing coalescence, agglomeration and breakup of the droplets. Temperature in the droplets stabilizing section 5 of the reaction vessel is maintained at 50-60° C. by circulating a thermic fluid such as hot water through the jacket over the droplet stabilizing section. Because of the presence of stabilizing agents like polyvinyl alcohol (PVA) in the liquid solution, the monomer droplets are partially polymerized and stabilized at 50-60° C. while flowing up in the droplet stabilizing section.

The upward flowing stabilized monomer droplets are viewed through the second transparent section 6. The stabilized monomer droplets flow out from the top of the reaction vessel 1 via the out flow line 35 and then horizontally into the polymerization reactor 41 via the horizontal flow line 37. The droplets are polymerized in the polymerization reactor 41 at 80-85° C. under agitation by the agitator 42. The polymer beads are collected from the polymerization reactor via the discharge line 46 by opening valve 47 in the discharge line. The polymer beads are dried, preferably in a tray dryer at 80 to 100° C., preferably at 90° C. and sieved.

According to the invention the monomer droplets are produced and stabilized and transported in the liquid solution upwardly by jetting the monomer solution and cocurrently jetting the liquid solution from above the monomer solution at a distance and at pulsating differential flow rates and differential pressures. The droplets in the liquid solution are allowed to rise in the reaction vessel in a smooth and controlled rhythmic manner, partially polymerise and stabilize with the stabilizers present in the liquid solution at controlled temperature of 50-60° C. and flow out of the reaction vessel. Because of the smooth upward flow of the monomer droplets in the liquid solution coalescence and agglomeration and breakup of the droplets are prevented. The droplets are also not subjected to any thermal shocks as there is only one temperature maintained in the droplet stabilizing section of the reaction vessel. Agglomeration and breakup of the monomer droplets are also prevented while flowing from the reaction vessel into the polymerization reactor as the monomer droplets flow horizontally in the horizontal flow line 37. As the monomer droplets are stabilized, they do not agglomerate or get damaged in the polymerization reactor.

The invention eliminates encapsulation and shell hardening of the monomer droplets and removal of the shells of the monomer droplets. Thermal energy requirement for carrying out the stabilization of the monomer droplets is low. As a result of all this, the invention is very simple to carry out, cycle time for carrying out the invention is reduced and the invention is very cost effective.

The apparatus is very simple in construction and easy to operate. It comprises few components and is very reliable. It requires negligible maintenance and is cost effective in terms of maintenance cost, capital cost and running cost. The modular construction of the apparatus, wherein the various sections are separately made or fabricated and assembled, further simplifies the construction of the apparatus and reduces assembly and disassembly times.

Because of the smooth and controlled upward flow of the monomer droplets in the reaction vessel and avoidance of coalescence and agglomeration and breakup of the droplets and avoidance of thermal shocks polymer beads of improved uniform particle sizes are obtained according to the invention. Therefore, the ion exchange resins made with the polymer beads of the invention will have improved kinetics in application.

EXAMPLES

The following examples are illustrative of the invention but not limitative of the scope thereof.

Example 1

The experiment was carried out in a typical apparatus of FIGS. 1 to 3 using a monomer solution comprising 88.9 parts of styrene, 11.1 parts of divinyl benzene of 63% and ethyl styrene of 37% mixture and 0.67 parts of benzoyl peroxide on the basis of monomer and an aqueous solution comprising 0.3 parts of polyvinyl alcohol and 4 parts of NaCl and remaining parts of water. There were 25 orifices in the orifice plate. Each orifice was 0.2 mm size. There were 20 holes in the circular ring. Each hole was 1 mm size. The monomer solution was jetted at flow rate of 2.7 liters per hour and at a pressure of 0.3 kg/cm$^2$ The aqueous solution was jetted at a flow rate of 5 liters per hour and at a pressure of 2.8 kg/cm$^2$. The holes in the circular ring were spaced above the orifices in the orifice plate at a height of 25 mm. The ratio between the monomer solution and aqueous solution was 1:4 v/v. The temperature in the monomer droplet stabilizing section of the reaction vessel was maintained at 55±5° C. Polymer beads were polymerized at 80±5° C. The polymer beads were washed with water, dried at 90° C. and sieved. The monomer to polymer conversion ratio achieved was greater than 95%, out of which 80% was of particle size in the range of 0.4 to 0.5 mm having uniformity coefficient of 1.07. The polymer beads were functionalized to make cation exchange resin.

Example 2

The experiment was carried out in a typical apparatus of FIGS. 1 to 3 using a monomer solution comprising 55.6 parts of styrene. 6.4 parts of mixture of divinyl benzene of 63% and 37% of ethyl styrene and 38 parts of isobutyl alcohol and 0.8 part of benzoyl peroxide on monomer basis and an aqueous solution comprising 0.3 parts of hydroxyl ethyl cellulose. 0.1 parts of sodium lingo sulphonate, 15 parts of sodium chloride and 2.5 parts of calcium chloride. There were 25 orifices in the orifice plate. Each orifice was 0.2 mm size. There were 20 holes in the circular ring. Each hole was 1 mm size. The monomer solution was jetted at flow rate of 6 liters per hour and at a pressure of 0.3 kg/cm$^2$ The aqueous solution was jetted at a flow rate of 5 liters per hour and at a pressure of 2.8 kg/cm$^2$. The holes in the circular ring were spaced above the orifices in the orifice plate at a height of 25 mm. The ratio between the monomer solution and aqueous solution was 1:4 v/v. The temperature in the monomer droplet stabilizing section of the reaction vessel was maintained at 55±5° C. The solvents were recovered by distillation. Polymer beads were polymerized at 80±5° C. The polymer beads were washed with water, dried at 90° C. and sieved to obtain beads of 75% particle size in the range of 0.42 to 0.5 mm having uniformity coefficient of 1.1. The monomer to polymer conversion ratio was greater than 95%. The polymer beads were functionalized to make anion exchange resin.

The above embodiment of the invention illustrated in the drawings is by way of example of the invention and should not be construed and understood to be limiting the scope of the invention. Several variations of the invention are possible without deviating from the scope thereof. The monomer solution distribution section and turbulence dampening section need not spherical. The pulsating monomer solution supply and liquid solution supply can be of a different configuration or construction. The transparent sections can be made of any other transparent and tough materials. The monomer solution distribution section, monomer droplet stabilizing section and turbulence dampening section all can be made of any other corrosion resistant material.

The orifice plate and tubular ring can be made of any other corrosion resistant material. The jacket of the monomer droplet stabilizing section can be made of any other corrosion resistant material. The monomer solution priming lines and valves are optional. The apparatus can be fabricated as a monolithic structure. Instead of jacketed monomer droplet stabilizing section, the stabilizing section can be provided with other heating means such as electric heating elements. The bypass line and valve and liquid solution priming line and valve are all optional. The polymerization reactor configuration and construction can be different. Such variations of the invention are obvious to a person skilled in the art and are to be construed and understood to be within the scope of the invention. The scope of the invention should be construed and understood to be defined by and encompassed within the following statement of claims.

What is claimed is:

1. A method for preparing polymer beads of uniform particle size by suspension polymerization comprising:
   (i) jetting a monomer solution of polymerizing monomers containing initiators into an upwardly flowing stream of monomer droplets through a plurality of orifices of 50-300 micron sizes at the bottom of a vertically located monomer droplets forming reaction vessel in a pulsating manner at a flow rate of 2-4 liters per hr and at a pressure of 0.2 to 1 Kg/cm$^2$ and simultaneously cocurrently jetting a liquid solution immiscible with the monomers and containing suspension stabilizers into an upwardly flowing stream through a plurality of holes of 0.5-1 mm sizes at the bottom of the reaction vessel spaced above and around the outer periphery of the orifices in a pulsating manner at a flow rate of 4-8 liters per hr and at a pressure of 2.5 to 3 Kg/cm$^2$, the ratio between the monomer solution and the liquid solution being 1:10 v/v and the holes being spaced above the orifices at a distance of 10-40 mm;
   (ii) allowing the monomer droplets in the liquid solution to rise up in the reaction vessel in a controlled and smooth manner under the dynamic forces exerted by differential flow rate and differential pressure between the pulsating monomer solution and liquid solution supplies and the differential densities between the monomer and liquid solutions without causing coalescence, agglomeration and breakup of the monomer droplets and allowing monomer droplets to stabilize by partial polymerization of the droplets by the suspension stabilizers in the liquid solution at 50 to 60° C. in the reaction vessel;

(iii) allowing the monomer droplets in the liquid solution to flow out from the reaction vessel horizontally into a polymerization reactor fitted with agitator and located at an elevated position with respect to the reaction vessel and get polymerized in the polymerization reactor at 80-85° C.

(iv) drying the polymer beads at 80 to 100° C.; and (v) sieving the polymer beads.

2. The method as claimed in claim 1, wherein the jetting of the monomer solution is carried out through orifices of 150-200 micron sizes at flow rate of 2.7 to 3.3 liters per hr and at a pressure of 0.3-0.5 kg/cm$^2$, the jetting of the liquid solution is carried out through holes of 0.8 mm size at flow rate of 5-6 liters per hr and at a pressure of 2.8 kg/cm$^2$, the ratio between the monomer solution and liquid solution is 1:4 and the holes are spaced above the orifices at a distance of 25 mm.

3. The method as claimed in claim 1, wherein the polymer beads are dried at 90° C.

\* \* \* \* \*